(12) United States Patent
Haldar

(10) Patent No.: US 7,895,273 B1
(45) Date of Patent: Feb. 22, 2011

(54) SYSTEM AND METHOD FOR SORTING INSTANT MESSAGES

(75) Inventor: Debashis Haldar, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2512 days.

(21) Appl. No.: 10/349,644

(22) Filed: Jan. 23, 2003

(51) Int. Cl.
*G06F 15/16* (2006.01)
(52) U.S. Cl. ............... 709/206; 709/223; 709/227; 370/229; 370/230; 370/232; 370/235
(58) Field of Classification Search .......... 709/206, 709/223, 227; 370/229, 230, 232, 235
See application file for complete search history.

(56) References Cited

U.S. PATENT DOCUMENTS

| | | | |
|---|---|---|---|
| 6,018,515 A * | 1/2000 | Sorber | 370/229 |
| 6,823,363 B1 * | 11/2004 | Noveck et al. | 709/204 |
| 2001/0041579 A1 | 11/2001 | Smith et al. | |
| 2002/0019879 A1 * | 2/2002 | Jasen et al. | 709/240 |
| 2003/0028580 A1 * | 2/2003 | Kucherawy | 709/101 |
| 2003/0065721 A1 * | 4/2003 | Roskind | 709/204 |
| 2003/0115270 A1 * | 6/2003 | Funk et al. | 709/206 |
| 2003/0131064 A1 * | 7/2003 | Bell et al. | 709/206 |

FOREIGN PATENT DOCUMENTS

WO WO 99/11003 4/1999

OTHER PUBLICATIONS

Campbell, et al., "Session Initiation Protocol (SIP) Extension for Instant Messaging," ftp://ftp.rfc-editor.org/in-notes/rfc3428.txt, pp. 1-17, printed from World Wide Web on Apr. 23, 2003.
Campbell, et al., "Session Initiation Protocol Extension for Instant Messaging draft-ietf-sip-message-07", ftp://ftp.rfc-editor.org/internet-drafts/draft-ietf-sip-message-07.txt, pp. 1-21, printed from World Wide Web on Sep. 24, 2002.
Lowery, et al., "Protocols for Providing Performance Guarantees in a Packet-Switching Internet", Computer Science Division, Department of Electrical Engineering and Computer Sciences, University of California, Berkeley pp. 1-19.
Braden, et al., "Resource ReSerVation Protocol (RSVP)", ftp://ftp.isi.edu/in-notes/rfc2205.txt, pp. 1-105, printed from the World Wide Web on Sep. 30, 2002.
Extreme Networks, "Policy Based Quality of Service", 2000, pp. 1-16.

* cited by examiner

Primary Examiner—Thuong T Nguyen

(57) ABSTRACT

An instant message delivery system includes a network interface for sending and receiving instant messages and a message queue. The system sorts instant messages by determining a priority weight for received messages. The priority weight of a message is determined by considering such characteristics as the size of the message, whether the sender is in a "buddy list" of the recipient, whether the recipient is in a "buddy list" of the sender, and/or whether the message has been marked as "urgent" by the sender. The received messages are then inserted into the queue at a position determined by their respective priority weights and are sent by the system in the order determined by their positions in the queue.

32 Claims, 4 Drawing Sheets

SYSTEM AND METHOD FOR SORTING INSTANT MESSAGES

BACKGROUND OF THE INVENTION

1. Field of the Invention

The present invention relates to the delivery of instant messages over a network.

2. Description of Related Art

Instant messaging is an increasingly popular form of communication, at least in part because of the convenience of instantaneous transmission of messages. However, as that popularity increases—along with the popularity of other forms of digital communication that may share the same communication channels, network congestion increasingly tends to slow the delivery of instant messages or even to prevent delivery altogether, thereby defeating one of the key advantages of instant messaging.

One common method of sending instant messages is through the use of SIP (Session Initiation Protocol) messages at the application layer and UDP (User Datagram Protocol) packets at the transport layer. SIP is described in, for example, IETF RFC-3261 (June 2002). One method used in SIP is the SIP "MESSAGE" method, in which requests of the type "MESSAGE" are used as instant messages to convey message bodies, such as text, between communicants. The MESSAGE method is described in the Internet Draft "Session Initiation Protocol Extension for Instant Messaging" (Sep. 14, 2002), available from the Internet Engineering Task Force (IETF). UDP is described in, for example, RFC 768 "User Datagram Protocol" (Aug. 28, 1980).

Individuals using an instant messaging system are often provided with a "buddy list" feature. The buddy list is a list of other instant messaging users that the individual wishes to keep track of. The individual is provided with information as to whether each user listed on the buddy list is available for messaging.

SUMMARY OF THE INVENTION

An instant message delivery system includes a network interface for sending and receiving instant messages and a message queue. The message queue stores instant messages received by the system until the messages can be forwarded to other network nodes or to the messages' final destinations. The system sorts instant messages by determining a priority weight for each incoming message. The priority weight of each message is determined by testing the message for the presence of characteristics such as the size of the message, whether the sender is in a "buddy list" of the recipient, whether the recipient is in a "buddy list" of the sender, and/or whether the message has been marked as "urgent" by the sender. The incoming messages are inserted into the queue at a position determined by their respective priority weights and are then sent by the system in the order determined by their positions in the queue. The system may operate to detect whether a network congestion condition exists. In that case, the system may sort instant messages only after detecting network congestion.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
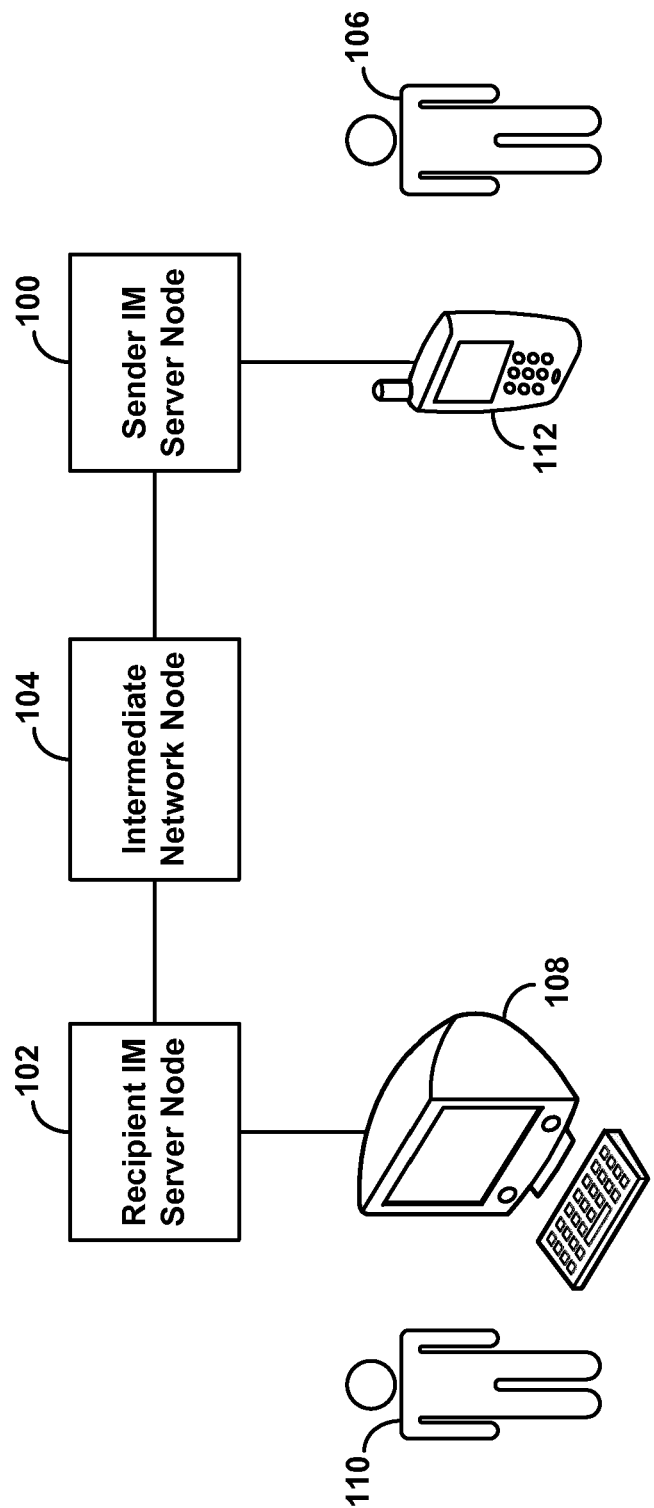
FIG. 1 is a schematic diagram of a network in which a system for sorting instant messages can be implemented.

In an exemplary embodiment, a system for merging instant messages for delivery is implemented in a network, as illustrated in FIG. 1, that includes a first instant message server node 100 and a second instant message server node 102. Server nodes 100 and 102 communicate through a network that may include an intermediate network node 104. A sender 106 who subscribes to an instant messaging service offered by the first instant message server 100 enters an instant message on a user terminal 112, such as a mobile phone or alternative instant messaging terminal. The instant message is addressed to a recipient 110, who subscribes to an instant messaging service offered by the recipient's instant message server 102. The instant message is sent from the user terminal 112 to the sender's instant message server 100. The sender's instant message server sends the message through one or more intermediate network nodes such as network node 104 to the recipient's instant message server 102 and is then delivered to a user terminal 108, such as a personal computer, where it can be displayed for the recipient 110. The system may also be implemented where instant messages are distributed using a single server node.

The system for sorting instant messages for delivery may be implemented in the sender's instant messaging server node 100, the intermediate network node 104, the recipient's instant messaging server node 102, and/or another network node. A node in which the system is implemented includes a message queue in which instant messages are stored between the time they are received at the node and the time they are sent to the recipient. Generally, a message located toward the front of the queue is sent before messages farther back in the queue, unless the queue is sorted and the position of the messages is changed.

Figure 3:
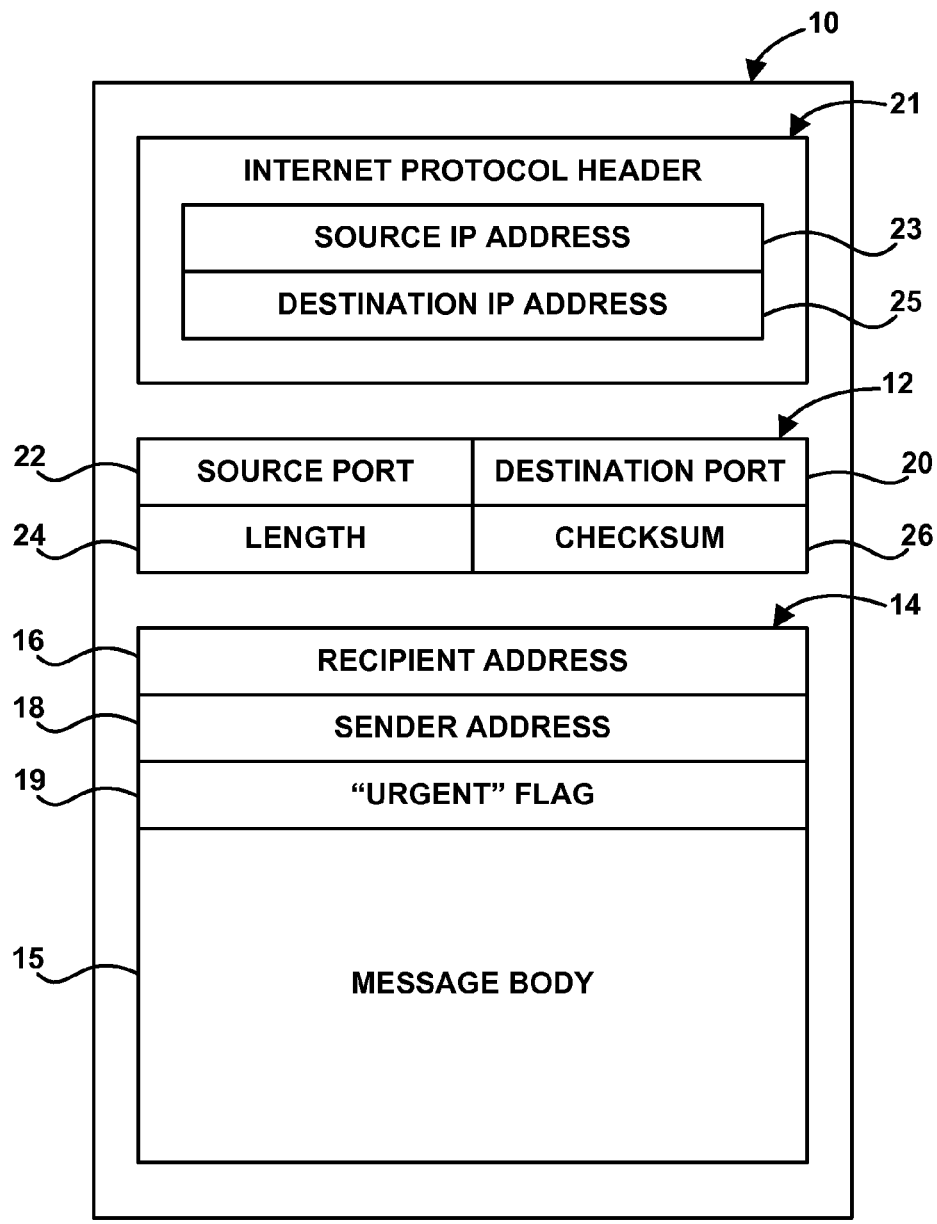
FIG. 3 is a schematic diagram of one format of instant message.

The instant messages received by the system may be encapsulated in a data packet 10, as illustrated in FIG. 3. The packet 10 includes a data header 12 and an instant message 14. The instant message 14 includes a recipient identifier 16, a sender identifier 18, and a message body 15. The instant message 14 may further include an "urgent" flag 19, which indicates whether the sender of the message has marked the message as urgent. The data packet 10 may be a transport-layer packet such as a UDP packet, in which case the data header 12 includes a destination port 20, a source port 22, a length field 24, and a checksum 26. Where the data packet 10 is a UDP packet, the instant message 14 makes up the "body" field of the UDP message. The UDP packet may itself be contained in one or more network-layer packets such as an Internet Protocol (IP) packets for transport over the network, as described in RFC 791 "Internet Protocol" (September 1981). In that event, an IP header 21 may be appended to the beginning of the data packet 10. An IP header 21 includes network addresses such as a source IP address 24 and a destination IP address 25. The destination IP address 25 specifies the network node to which the data packet 10 should be routed. Techniques other than the use of IP packets are known for transporting instant messages over a network and may alternatively be employed in this system. Techniques other than IP packets are known for transporting instant messages over a network and may alternatively be employed in this system.

An exemplary instant message 14 is an application-layer packet that includes a message header and a message body. The instant message 14 may be a SIP message of type "MESSAGE." In that case, the instant message 14 includes the recipient identifier 16 in a "To:" field and the sender identifier 18 in a "From:" field. The "To:" and "From:" fields are in a header of a SIP instant message. A "Content-type:" field in the header identifies the type of data sent in the message body. The message body may be a text message or an alternative message type, such as an image or audio message.

An exemplary instant message 14 in SIP "MESSAGE" format appears as follows:

MESSAGE sip:user2@domain2.com SIP/2.0
Via: SIP/2.0/TCP user1pc.domain.com;
  branch=z9hGsgdkse
From: sip:user1@domain1.com;tag=49583
To: sip:user2@domain2.com
Call-ID: asd88asd77a@1.2.3.4
CSeq: 1 MESSAGE
Content-Type: text/plain
Content-Length: 18
Watson, come here.

In this case, the sender identifier is one instant messaging inbox address, "user1@domain.com", and the recipient identifier is another instant messaging inbox address, "user2@domain.com". The media type is specified in the header as the MIME type "text/plain". The message body is in this example the eighteen characters of the text "Watson, come here."

An instant message 14 may take formats other than a SIP message, such as an XML message, exemplified by the following sample message.

<message from='user1@domain1.com'
to='user2@domain2.com'
id='messageid2'
type='normal'>
<thread>threadid_02</thread>
<subject>Spill</subject>
<body>Watson, come here.</body>
</message>

In this exemplary XML message, the sender, recipient, and message body are identical to those in the SIP message of the previous example. Other formats for the structure of an instant message may also be implemented in the system.

Figure 4:
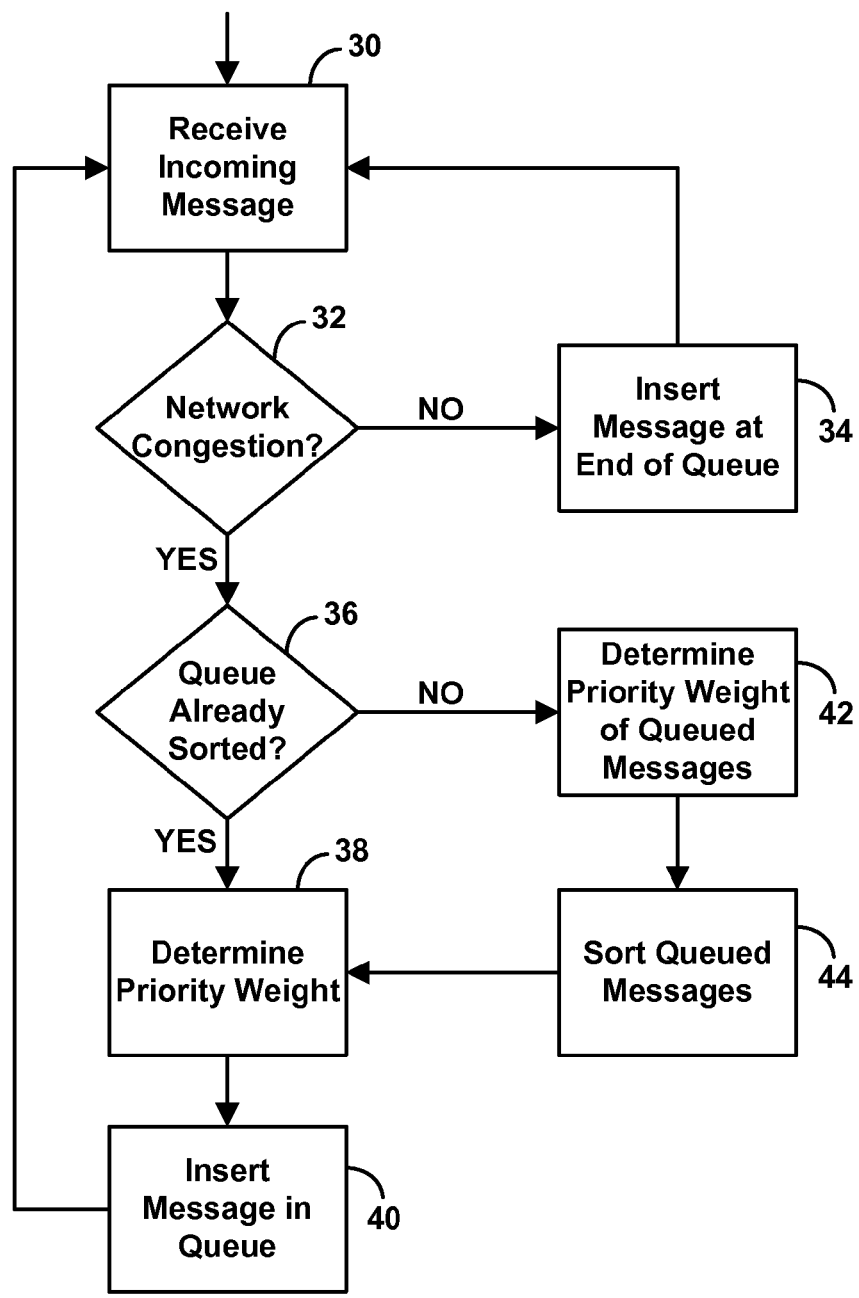
FIG. 4. is a flow chart of an exemplary method for sorting instant messages.

The operation of one such system is illustrated by the flow chart of FIG. 4. In one embodiment, when an instant message is received by the system at step 30, the system detects at step 32 whether there is network congestion. The system may detect congestion by counting the number of messages in the message queue. If the number of instant messages in the message queue reaches a threshold determined by design considerations, the system determines that there is network congestion. Such design considerations may include a comparison of the average amount of time it takes to send each instant message with the amount of processor time it takes to sort instant messages, so that the sending of a message is not delayed while that message is being sorted in the queue. A message queue length of thirty is one suggested threshold at which the system begins sorting instant messages. The system may employ alternative methods of determining whether network congestion exists, such as detecting a number of dropped data packets, measuring response times of nodes along the network, or other methods of congestion detection. If there is no network congestion, the received instant message is added to the message queue in step 34. Where the message queue is a first-in-first-out queue, the message is inserted at the end of the queue. The system does not necessarily operate to detect whether network congestion exists. The system may operate to sort messages regardless of the presence of congestion.

To sort the messages, the system may first determine at step 36 whether the messages already in the queue have been given respective priority weight values. If so, the system calculates at step 38 a priority weight for the incoming instant message and, at step 40, inserts the message into the queue at a position determined by its priority weight, so that the messages in the queue are ordered according to their priority weights.

If, at step 32, the system determines that the message in the queue have not been given priority weights, the system may, at step 42, give priority weights to the messages already in the queue and sort those messages according to their respective priority weights at step 44.

The determination of a priority weight at step 38 may be based on various factors or combinations thereof. The system may determine the priority weight of a message by considering such factors as the size of the message, whether the sender is in a "buddy list" of the recipient, whether the recipient is in a "buddy list" of the sender, and/or whether the message has been marked as "urgent" by the sender, or other characteristics of the instant message, such as particular text appearing in a subject line of the message. The system may refer to a user data storage stored in a computer memory to determine user preferences for the calculation of a priority weight.

The system may operate by testing for characteristics of an instant message and adjusting the priority weight based on whether the instant message has each of these characteristics. The characteristics used by the system and the weight given to the characteristics may be preselected by system design or by the choices of individual users. For example, the system may provide a Web site that the user can access to set preferences for priority weighting. A user may access a table stored in the user data storage and associated with the user such as Table 1 illustrated below. The table may be associated with the user by, for example, being indexed by an instant messaging inbox address of the user. The system then selects characteristics associated with the user and determines the priority weight of a message by testing whether the message has the selected characteristics.

TABLE 1

| CATEGORY | USER PARAMETER | VALUE (±5) |
|---|---|---|
| Urgent | n/a | +3 |
| Sent by Buddy | n/a | +5 |
| Buddy of Sender | n/a | +2 |
| Key Words | "meet" | +4 |
| | "get rich" | −5 |
| Sender Domain | "mycorp.com" | +2 |
| | "newsbulletin.com" | +5 |

The system may assign a default priority weight (zero points, for example) to an instant message before determining a final priority weight based on the characteristics of the message. In this example, the system tests whether an incoming message is marked "urgent" and, if so, increases the priority by three points. Likewise, the system adds five points if the message was sent from an user listed in the buddy list of the recipient, and adds two points if the recipient is listed in the buddy list of the sender. In one embodiment, a user's buddy list is located on an instant messaging server associated with a service to which the user subscribes. The buddy list may then be propagated to subcarrier servers. The system may check a user's buddy list by, for example, consulting a remote server which stores the user's buddy list or by storing its own copy of users' buddy lists. Buddy lists may be stored in the user data storage, in a different computer memory, or in a remote server.

The system may allow users to select search terms whose presence in an instant message increases the priority weight of the message. In that case, the user may select search terms that are stored in the user data storage, and the system searches incoming messages for those search terms and adjusts the priority weight according to whether the selected search terms are present in the message. The system may search for the search terms in a subject line of the message and/or in the entirety of the message. The system may also make use of domain names entered by a user by adjusting the priority weight according to whether a message was sent from a selected domain name. Any of a variety of other properties of incoming messages, such as the length of the messages, may be considered by the system in determining the priority weight. The system may adjust the priority weight based on whether the message is over or under a preselected message length. For example, longer messages, such as messages over thirty characters in length, may be given a higher priority weight.

The presence or absence of the properties identified above may increase or decrease a message's priority weight, depending on user preferences and/or default behavior of the system. For example, certain search terms, such as "meeting," may increase the priority weight of messages in which they appear, while other search terms, such as "get rich," may signal a less desirable message and cause the system to supply a lower priority weight for the message.

In determining a priority weight of instant messages, the system may refer to data storage records associated with the recipient of the message and/or data storage records associated with the sender of the message (stored, for example, in a database indexed by user addresses). User data storage records associated with the recipient may include but need not be limited to the recipient's buddy list, key words, preferred domain names, and the weight given to each of these factors. User data storage records associated with the sender may include, among other things, the sender's buddy list. As an alternative to the use of user data storage records, or in addition thereto, the system may use preselected parameters for all users or as a default for users who have not chosen particular parameters. For example, the system may increase the priority of all messages sent from an address on the recipient's buddy list by a fixed amount, and/or the system logic may increase the priority of all messages with the urgent flag set.

The system need not operate only by increasing or decreasing the priority weight additively according to characteristics of the message. Other methods of selecting a priority weight may be employed, such as applying a multiplicative factor to adjust the priority weight of a message having a particular characteristic or selecting a priority weight from a lookup table or other memory location.

The system may operate to limit or otherwise adjust the priority weight of instant messages to ensure consistency of service among different users so that users cannot increase the priority of most or all incoming messages addressed to them at the expense of instant messages addressed to other users that are in the same queue.

Moreover, the system may further operate to provide a waiting-time limit for queued messages to prevent messages with low priority weight from being pushed to the end of the queue indefinitely. The system may accomplish this by providing a timer for each queued message, from which the system is able to identify the amount of time a message has spent in the queue. For example, the system may store the time at which each message was added to the queue and periodically check whether any messages have been in the queue for longer than a maximum waiting period. Messages that have been in the queue for longer than the maximum waiting period may be moved to the front of the queue or otherwise sent in advance of other messages without regard to priority weight. The maximum waiting period may be, for example, eight seconds.

Protocols such as SIP may be used both for the sending of instant messages and for initiating persistent media sessions such as voice-over-IP (VoIP) telephony. Where a network node such as node 100, 102, or 104 manages messages used to initiate both instant messaging sessions and other media sessions, such as VoIP, the system may be used to prioritize instant messages versus other media sessions. For example, a user may access the user data storage 214 through a Web site and select that instant messages should be given a higher (or lower) priority weight than messages initiating other media sessions. In this case, instant messages and messages initiating other media sessions may be stored in the same queue. This embodiment may be implemented in a system in which the IM server also provides VoIP services or in which an instant messaging server is in communication with a separate VoIP server. In this embodiment, the priority weight of an instant message may depend on whether the recipient is engaged in VoIP communications. For example, an instant message received during a VoIP communication may receive a low priority weight and its delivery will be delayed relative to other messages with a higher priority weight. This embodiment is most useful when a user receives instant messages and VoIP communications on the same device, such as a mobile telephone.

Once the system determines a priority weight of an instant message, it inserts the message in the message queue at a position determined by the priority weight of the message. For example, the queue may be stored as a data structure with the messages sorted in order of decreasing priority weight, in which the first messages (those that will be sent first) have the highest priority weight and the last messages have the lowest priority weight. Incoming messages whose priority weight has been calculated are then inserted into the queue between a message having the next lower priority weight and a message having the next higher priority weight. In one embodiment, the message queue is a multi-user message queue that stores instant messages addressed to a variety of recipients. In another embodiment, the system employs one or more single-user message queues, with each queue being used only for messages addressed to a single recipient user.

To avoid delays in the sending of messages that are about to be sent by the system (i.e., messages at the front of the queue), the system, in one embodiment, does not insert incoming messages in a buffer region at the front of the queue. As an example, if the buffer region consists of five message, then although an incoming message may have a priority weight high enough to place it within the first five messages, that message could be inserted sixth in the queue. Moreover, when the system sorts the queue at step 44 (FIG. 4), it may leave the buffer region (e.g. the first five messages) unsorted to prevent delays in sending those messages.

Figure 2:
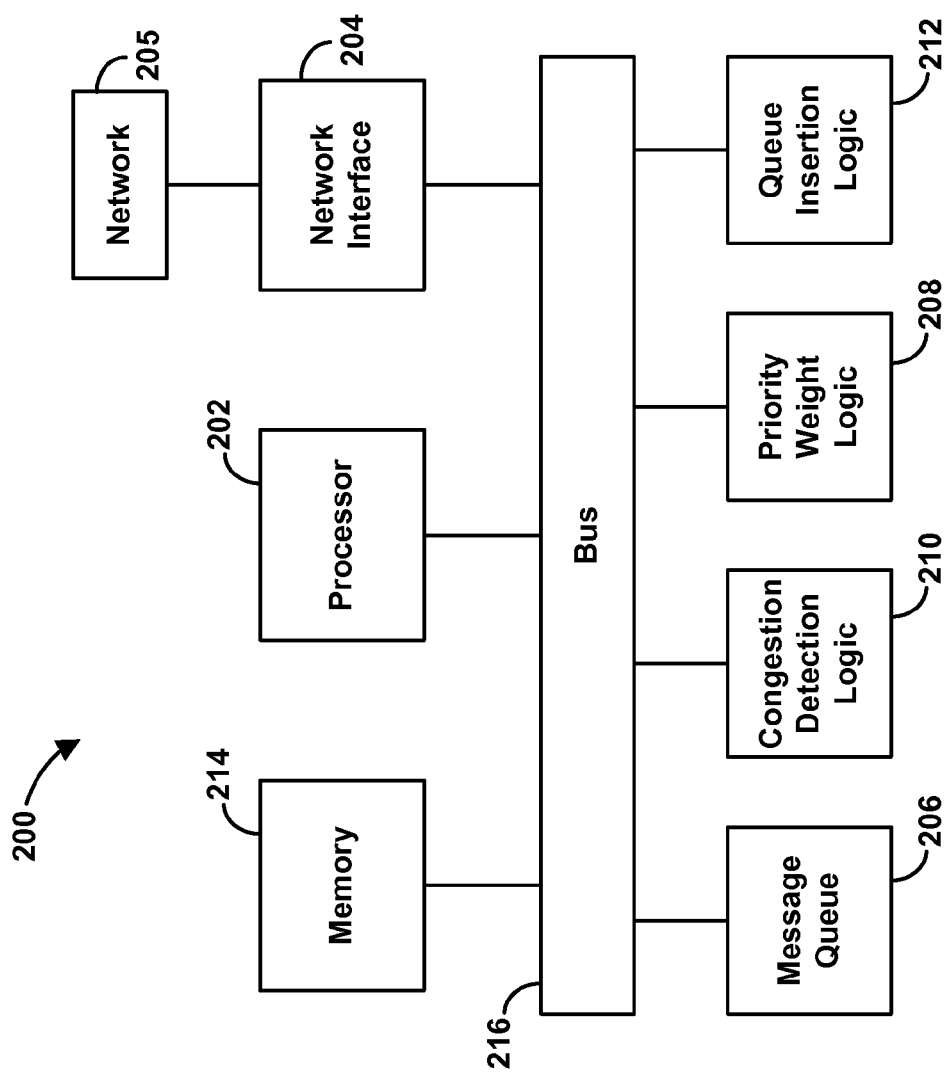
FIG. 2 is a block diagram of one implementation of a system for sorting instant messages.

To perform the functions described above, an exemplary system 200, represented schematically in FIG. 2, is provided with a processor 202 and a network interface 204 to a network 205. The network interface 204 includes logic for receiving data packets that include instant messages. The system 200 also includes a message queue 206 for storing instant messages until those messages can be forwarded over the network 205. The system further includes congestion detection logic 210 for determining when there is network congestion. The congestion detection logic 210 may interface with the message queue 206 to determine that network congestion exists when the message queue 206 exceeds a particular size. Priority weight logic 208 is provided to determine the priority weight of incoming instant messages and/or queued instant messages. When the priority weight logic 208 determines the priority weight of an instant message, queue insertion logic 212 inserts the instant message in the message queue 206. The network interface 204 sends instant messages in the message queue 206 to the recipient user, starting with messages at the front of the queue 206. The network interface 204 might send messages to their respective recipients indirectly, via other network nodes, as is known in Internet routing, or it may deposit the message directly in an instant message inbox of the recipient if the recipient has an inbox on a server in which the system 200 is implemented.

The various components of the system 200 may communicate over a bus interface 216, as illustrated in FIG. 2, or they may, for example, be implemented using different processors in different computers communicating by an alternative digital interface, such that the processor 202 should be construed to include multiple processors. The congestion detection logic 210, priority weight logic 208, queue insertion logic 212, and software components of the network interface 204 may be implemented as machine language instructions stored in a computer memory 214 and executed by the processor 202. The message queue 206 may likewise be implemented in the same computer memory 214 or in a different memory location. User preferences used by priority weight logic 208 may likewise be stored a user data storage in the memory 214 or elsewhere in a computer memory.

Exemplary embodiments of the present invention are described above. Those skilled in the art will understand, however, that changes and modifications may be made to this embodiment without departing from the true scope and spirit of the present invention as defined by the following claims.

The invention claimed is:

1. A method of sorting instant messages for delivery, comprising:
receiving a first instant message and a second instant message, the first and second messages being addressed to different recipients;
determining a first priority weight of the first instant message and a second priority weight of the second instant message;
selecting one of the first instant message and the second instant message having a priority weight higher than the other of the first instant message and the second instant message;
sending the selected one of the first instant message and the second instant message before sending the other of the first instant message and the second instant message.

2. The method of claim 1, further comprising detecting a network congestion condition, the step of determining a first priority weight of the first instant message and a second priority weight of the second instant message being performed only after a network congestion condition is detected.

3. A method of sorting instant messages for delivery, comprising:
receiving a first instant message and a second instant message, the first and second messages being addressed to different recipients;
determining a first priority weight of the first instant message and a second priority weight of the second instant message;
inserting the first instant message in a message queue; and
inserting the second instant message in the message queue, wherein the second instant message is inserted in front of the first instant message in the message queue if the second priority weight is higher than the first priority weight.

4. The method of claim 3, further comprising detecting a network congestion condition, the step of determining a priority weight being performed only after a network congestion condition is detected.

5. A method of sorting instant messages for delivery, comprising:
receiving a first instant message at a server having an instant message queue, wherein the first instant message has a first recipient identifier and a second instant message in the queue has a priority weight and a second recipient identifier different from the first recipient identifier;
selecting, from a user data storage, a message characteristic associated with the first recipient identifier, wherein the message characteristic is selected from the group consisting of (a) having a sender of the message listed in a buddy list of the recipient, (b) having an urgent flag of the message set, (c) having a preselected message length, and (d) including a preselected search term;
testing the first instant message to determine whether the first instant message has the selected message characteristic;
determining a priority weight of the first instant message, the determined priority weight depending at least in part on whether the first instant message has the selected message characteristic; and
inserting the first instant message in the instant message queue at a position determined by the priority weight of the first instant message, such that the first instant message is inserted in front of the second instant message if the priority weight of the first instant message is greater than the priority weight of the second instant message.

6. The method of claim 5, further comprising detecting a network congestion condition, the step of determining a priority weight being performed only after a network congestion condition is detected.

7. The method of claim 5, wherein the priority weight of the first instant message is based at least in part on whether the first instant message has one or more of a plurality of message characteristics.

8. The method of claim 5, wherein the selected message characteristic is having a sender of the message listed in a buddy list of the recipient.

9. The method of claim 5, wherein the selected message characteristic is having an urgent flag of the message set.

10. The method of claim 5, wherein the selected message characteristic is having a preselected message length, and wherein a greater priority weight is assigned to messages having a message length greater than a threshold length.

11. A method of sorting instant messages for delivery, comprising:
receiving a plurality of instant messages at a server having an instant message queue, wherein the queue includes two or more messages addressed to different recipients;
determining a priority weight of one or more of the received instant messages, wherein the priority weight is determined at least in part by whether a sender of the received instant message is in a buddy list of the recipient of the received message;

sorting the message queue according to the priority weights of the received instant messages; and sending the received instant messages from the message queue in the order of the position of the received instant messages in the queue.

12. The method of claim 11, further comprising detecting a network congestion condition, the step of determining a priority weight being performed only after a network congestion condition is detected.

13. A method of sorting instant messages for delivery, comprising:

receiving a plurality of instant messages at a server having an instant message queue, wherein the queue includes two or more instant messages addressed to different recipients, each instant message has a priority weight, and each instant message includes an urgent flag;

determining a priority weight of one or more of the received instant messages, wherein the priority weight is determined at least in part by whether an urgent flag of the instant message is set; and inserting each received instant message in the instant message queue at a position determined by the priority weight of each respective received instant message, such that received instant messages inserted toward the front of the queue have a higher priority than instant messages inserted toward the back of the queue.

14. The method of claim 13, further comprising testing for a network congestion condition, the step of determining a priority weight being performed only after a network congestion condition is detected.

15. A method of sorting instant messages for delivery, comprising:

receiving an instant message at a server having an instant message queue, wherein two or more queued messages addressed to different recipients are stored in the message queue, each queued message having a priority weight;

detecting whether a network congestion condition exists;

after detecting that a network congestion condition exists, determining a priority weight of the received instant message, wherein the determined priority weight depends at least in part on whether the received instant message has one or more selected message characteristics; and inserting the received instant message in the instant message queue at a position determined by the priority weight of the received instant message such that the received instant message is inserted between one or more queued messages having a higher priority weight than the received message and one or more queued messages having a lower priority weight than the received message.

16. The method of claim 15, wherein one of the selected message characteristics is having a sender of the message listed in a buddy list of the recipient.

17. The method of claim 15, wherein one of the selected message characteristics is having an urgent flag of the message set.

18. The method of claim 15, wherein one of the selected message characteristics is having a preselected message length, and wherein a greater priority weight is assigned to messages having a message length greater than a threshold length.

19. A system for sorting instant messages for delivery, comprising:

a network interface for receiving a plurality of instant messages, each instant message having a recipient and a sender;

a message queue for storing instant messages, wherein two or more queued messages addressed to different recipients are stored in the message queue, and wherein one or more of the queued messages has a priority weight;

priority weight logic operative to determining a priority weight of a selected one or more of the received instant messages, wherein the priority weight is determined at least in part by whether the sender of a selected instant message is in a buddy list associated with the recipient of the selected instant message; and queue insertion logic operative to insert the selected instant messages in the instant message queue at a position determined by the priority weight of the respective selected instant message, such that the selected one or more received instant messages are inserted in front of one or more queued messages having a lower priority weight than the selected one or more received instant messages.

20. The system of claim 19, further comprising congestion detection logic, the priority weight logic being operative to determine a priority weight of received instant messages only after the congestion detection logic detects a network congestion condition.

21. A system for sorting instant messages for delivery, comprising:

a network interface for receiving a plurality of instant messages, each instant message having an urgent flag;

a message queue for storing queued instant messages, wherein two or more queued messages addressed to different recipients are stored in the message queue, each queued message having a priority weight;

priority weight logic operative to determine a priority weight of a selected one or more of the received instant messages, wherein the priority weight of each selected message is determined at least in part by whether the urgent flag of the selected instant message is set;

queue insertion logic operative to insert the selected instant messages in the message queue at a position determined by the priority weight of the respective selected instant message, such that the selected one or more instant messages are inserted in the message queue in front of one or more queued messages having a lower priority weight.

22. The system of claim 21, further comprising congestion detection logic, the priority weight logic being operative to determine a priority weight of instant messages only after the congestion detection logic detects a network congestion condition.

23. A system for sorting instant messages for delivery, comprising:

a network interface operative to receive an instant message, the instant message having a recipient;

a message queue for storing queued instant messages, wherein two or more queued messages are addressed to different recipients, and wherein one or more of the queued messages has a priority weight;

a user data storage including data identifying a message characteristic associated with the recipient;

priority weight logic operative to test the received instant message to determine whether the received instant message has the message characteristic and to determine a priority weight of the received instant massage, the determined priority weight depending at least in part on whether the received instant message has the message characteristic; and queue insertion logic operative to insert the received instant messages in the instant message queue at a position determined by the priority weight of the received instant message, such that the received instant message is inserted in the message queue in front of one or more queued messages having a lower priority weight than the received instant messages.

24. The system of claim 23, further comprising congestion detection logic, the priority weight logic being operative to determine a priority weight of received instant messages only after the congestion detection logic detects a network congestion condition.

25. The system of claim 23, wherein the message characteristic is having a sender of the message listed in a buddy list of the recipient.

26. The system of claim 23, wherein the message characteristic is having an urgent flag of the message set.

27. The system of claim 23, wherein the message characteristic is having a preselected message length, and wherein a greater priority weight is assigned to messages having a message length greater than a threshold length.

28. A system for sorting instant messages for delivery, comprising:

a network interface operative to receive an instant message, the received instant message having a recipient;

a message queue for storing queued instant messages, wherein one or more of the queued message has a priority weight and wherein the queue includes instant messages addressed to different recipients;

congestion detection logic operative to detect whether a network congestion condition exists;

priority weight logic operative to test the instant message after detection of a network congestion condition to determine whether the received instant message has at least one message characteristic and to determine a priority weight of the received instant message, the determined priority weight depending at least in part on whether the received instant message has the at least one selected message characteristic, the message characteristic being selected from the group consisting of (a) having a sender of the message listed in a buddy list of the recipient, (b) having an urgent flag of the message set, (c) having a preselected message length, and (d) including a preselected search term; and queue insertion logic for inserting the received instant message in the instant message queue at a position determined by the priority weight of the instant message, such that the received instant message is inserted in the message queue in front of one or more queued messages having a lower priority weight than the received instant message.

29. The system of claim 28, wherein the message characteristic is having a sender of the message listed in a buddy list of the recipient.

30. The system of claim 28, wherein the message characteristic is having an urgent flag of the message set.

31. The system of claim 28, wherein the message characteristic is having a preselected message length, and wherein a greater priority weight is assigned to messages having a message length greater than a threshold length.

32. A system for sorting instant messages for delivery, comprising:

a network interface operative to receive an instant message, the received instant message having a recipient;

a message queue for storing queued instant messages addressed to different recipients and for storing a priority weight associated with queued instant messages;

a processor;

a user data storage including data identifying message characteristics associated with the recipient;

a computer memory for storing machine language instructions executable by the processor to i) select, from the user data storage, at least one message characteristic associated with the recipient, the message characteristic being selected from the group consisting of (a) having a sender of the message listed in a buddy list of the recipient, (b) having an urgent flag of the message set, (c) having a preselected message length and (d) including a preselected search term, ii) test the received instant message to determine whether the received instant message has the selected message characteristic, iii) determine a priority weight of the received instant message, the determined priority weight depending at least in part on whether the received instant message has the selected message characteristic, and iv) insert the received instant message in the instant message queue at a position determined by the priority weight of the received instant message, such that the received instant message is inserted in the message queue in front of one or more queued messages having a lower priority weight than the received instant message;

the network interface further being operative to send instant messages from the queue in the order the instant messages are arranged in the queue.

\* \* \* \* \*